United States Patent
Kataria et al.

(10) Patent No.: US 11,016,665 B2
(45) Date of Patent: May 25, 2021

(54) EVENT-BASED DYNAMIC MEMORY ALLOCATION IN A DATA STORAGE DEVICE

(71) Applicant: Seagate Technology LLC, Cupertino, CA (US)

(72) Inventors: Abhay T. Kataria, Longmont, CO (US); Amruta Rameshchandra Inamdar, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 15/877,710

(22) Filed: Jan. 23, 2018

(65) Prior Publication Data

US 2019/0227712 A1   Jul. 25, 2019

(51) Int. Cl.
*G06F 3/06* (2006.01)

(52) U.S. Cl.
CPC ............ *G06F 3/0607* (2013.01); *G06F 3/065* (2013.01); *G06F 3/0619* (2013.01); *G06F 3/0622* (2013.01); *G06F 3/0625* (2013.01); *G06F 3/0634* (2013.01); *G06F 3/0653* (2013.01); *G06F 3/0659* (2013.01); *G06F 3/0679* (2013.01)

(58) Field of Classification Search
CPC ...... G06F 12/00; G06F 3/0647; G06F 3/0619; G06F 3/0622; G06F 3/0625; G06F 3/0634; G06F 3/065; G06F 3/0653; G06F 3/0659; G06F 3/0679

USPC ........................................................ 711/103
See application file for complete search history.

(56) References Cited

U.S. PATENT DOCUMENTS

| | | | |
|---|---|---|---|
| 7,716,422 B2 | 5/2010 | Shin et al. | |
| 7,953,929 B1 | 5/2011 | Chatterjee et al. | |
| 8,639,878 B1 | 1/2014 | Chatterjee et al. | |
| 8,756,375 B2 | 6/2014 | Flynn | |
| 9,250,817 B2 | 2/2016 | Flynn et al. | |
| 9,251,052 B2 | 2/2016 | Talagala et al. | |
| 9,280,477 B2 | 3/2016 | Friendshuh et al. | |
| 9,342,446 B2 | 5/2016 | Hutchison et al. | |
| 9,563,555 B2 | 2/2017 | Flynn et al. | |
| 2008/0049354 A1* | 2/2008 | Nitta | G11B 19/042 360/72.1 |
| 2011/0119442 A1* | 5/2011 | Haines | G06F 12/0246 711/113 |

(Continued)

*Primary Examiner* — Gautam Sain
(74) *Attorney, Agent, or Firm* — Westman, Champlin & Koehler, P.A.

(57) ABSTRACT

A data storage device that includes data storage media, with at least one of the data storage media having a plurality of embedded firmware modules. The data storage media include a non-volatile memory having different usage modes, with each different usage mode being associated with a different status of the data storage device, and each of the different usage modes having different space allocation configurations for data generated by the plurality of embedded firmware modules. A controller communicatively coupled to the non-volatile memory. The controller determines a change in the status of the data storage device and, in response to the change in the status of the data storage device, dynamically alters the usage mode of the non-volatile memory from a first one of the usage modes to a second one of the usage modes.

20 Claims, 7 Drawing Sheets

(56) References Cited

U.S. PATENT DOCUMENTS

| | | | |
|---|---|---|---|
| 2011/0173373 A1* | 7/2011 | Scouller | G06F 12/0246 |
| | | | 711/103 |
| 2012/0151134 A1* | 6/2012 | Friendshuh | G06F 12/0868 |
| | | | 711/113 |
| 2013/0179624 A1* | 7/2013 | Lambert | G06F 12/0246 |
| | | | 711/103 |
| 2013/0283079 A1* | 10/2013 | Puthiyedath | G06F 1/3234 |
| | | | 713/323 |
| 2013/0304979 A1* | 11/2013 | Zimmer | G06F 13/14 |
| | | | 711/103 |
| 2014/0089626 A1* | 3/2014 | Schluessler | G06F 9/45558 |
| | | | 711/170 |
| 2014/0344504 A1* | 11/2014 | Luo | G06F 12/0842 |
| | | | 711/103 |
| 2016/0077968 A1 | 3/2016 | Sela et al. | |
| 2017/0177492 A1* | 6/2017 | Loh | G06F 12/084 |
| 2017/0185523 A1 | 6/2017 | Trika et al. | |
| 2017/0185645 A1 | 6/2017 | Agarwal et al. | |

* cited by examiner

EVENT-BASED DYNAMIC MEMORY ALLOCATION IN A DATA STORAGE DEVICE

BACKGROUND

Data storage devices are typically included in systems having one or more host computers. Examples of data storage devices include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit.

SUMMARY

In one embodiment, a data storage device is provided. The data storage device includes data storage media, with at least one of the data storage media having a plurality of embedded firmware modules. The data storage media include a non-volatile memory having different usage modes, with each different usage mode being associated with a different status of the data storage device, and each of the different usage modes having different space allocation configurations for data generated by the plurality of embedded firmware modules. A controller is communicatively coupled to the non-volatile memory. The controller determines a change in the status of the data storage device and, in response to the change in the status of the data storage device, dynamically alters the usage mode of the non-volatile memory from a first one of the usage modes to a second one of the usage modes.

In another embodiment, a method is provided. The method includes detecting an event in a data storage device that causes a change in a status of the data storage device. The change in the status of the data storage device places the data storage device in an operating mode other than a normal operating mode of the data storage device. The method further includes, upon determining that the status of the data storage device has changed as a result of the detected event, dynamically altering a usage mode of a non-volatile memory in the data storage device from a first one of a plurality of usage modes to a second one of the plurality usage modes.

In yet another embodiment, a data storage device is provided. The data storage device includes a non-volatile memory including a first portion having a plurality of embedded firmware modules and a second portion configured to store data generated by the embedded firmware modules. The second portion of the non-volatile memory has different usage modes, with each different usage mode being associated with a different status of the data storage device, and each of the different usage modes has different space allocation configurations for the data generated by the plurality of embedded firmware modules. A controller is communicatively coupled to the non-volatile memory. The controller determines a change in the status of the data storage device and, in response to the change in the status of the data storage device, dynamically alters the usage mode of the second portion of the non-volatile memory from a first one of the usage modes to a second one of the usage modes.

This summary is not intended to describe each disclosed embodiment or every implementation of the event-based dynamic memory allocation system described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1A:
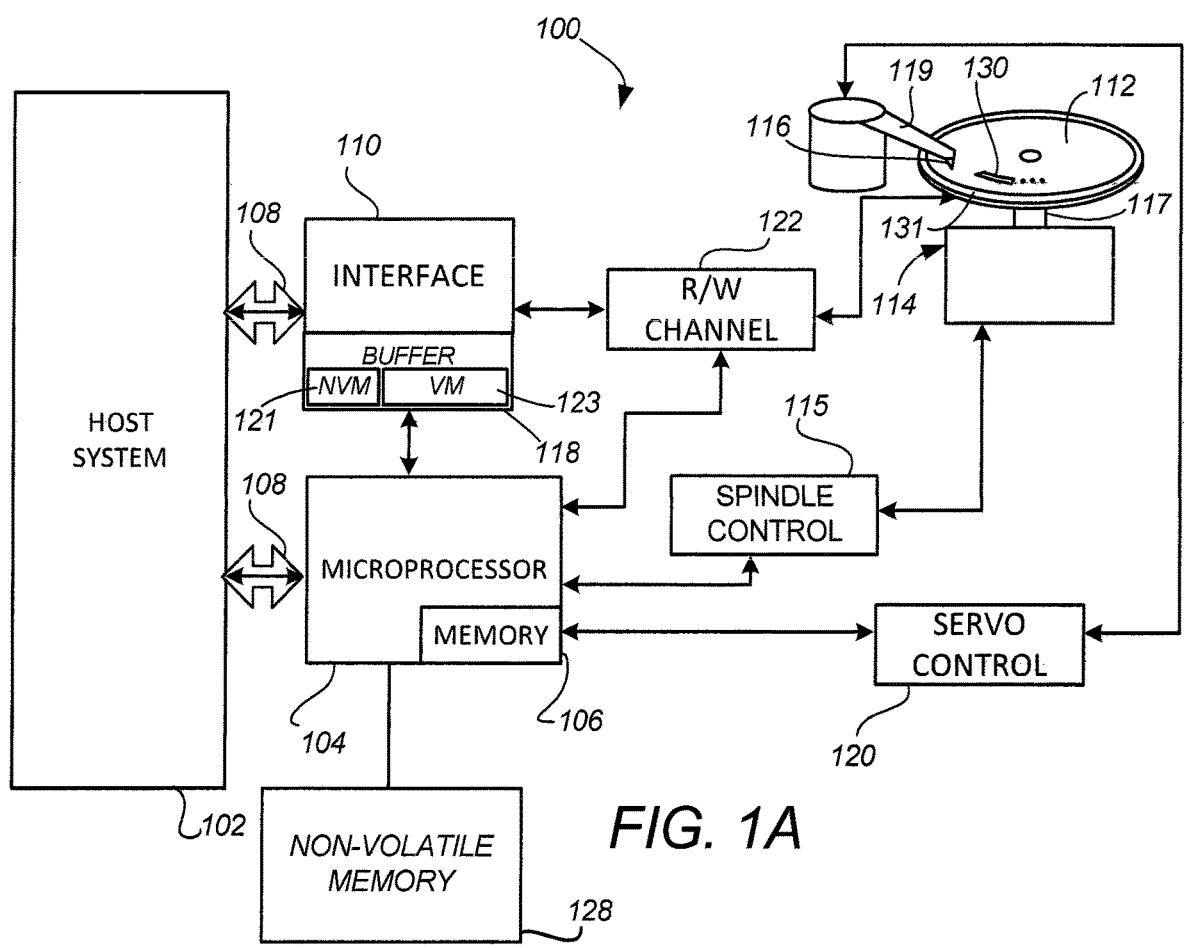
FIG. 1A is a block diagram of a data storage device that employs memory management technique in accordance with one embodiment.

Non-volatile memory (e.g., solid-state memory such as Flash memory) is relatively expensive and therefore data storage devices such as disc drives only have a limited amount of non-volatile cache memory space. Currently, the limited non-volatile cache memory space is statically allocated to a subset of embedded firmware modules (e.g., to a first subset of firmware modules that are activated to transfer data from a buffer memory to the non-volatile cache memory upon power loss). Other ones of the plurality of firmware modules (e.g., a second subset activated upon a head-disc collision event) may not have any allocated non-volatile cache space.

The disclosure generally describes a technique for managing a non-volatile memory that addresses problems associated with a limited amount of memory space (e.g., cache memory space). The technique involves dynamically allocating portions of the non-volatile memory to different subsets of a plurality of embedded firmware modules according to differing conditions in a data storage device that includes the non-volatile memory. The technique for managing the non-volatile memory may include memory overlay operations that allow for repeated use of a same portion of the non-volatile memory under different conditions in the data storage device; for instance, when a particular event takes place in the device resulting in a change in device status, information related to that event may replace all or part of existing data (e.g., data that was stored in response to a prior event) in the same portion of the non-volatile memory. Examples of data storage devices that employ such a memory management technique are described below in connection with FIGS. 1A-1F and 2.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse,"

"clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A shows a block diagram of a disc drive 100 that employs a memory management technique in accordance with one embodiment. It should be noted that disc drive 100 is a particular example of a data storage device and others types of data storage devices may employ the memory management techniques in accordance with the present embodiments.

Disc drive 100 is shown in FIG. 1 to be operably connected to a host computer 102 in which disc drive 100 may be mounted. Disc drive 100 includes a microprocessor system 104 that generally provides top level communication and control for disc drive 100 in conjunction with programming for microprocessor system/control circuit 104 stored in microprocessor memory 106. Disc drive 100 may communicate with host computer 102 using a bus 108.

Memory 106 can include RAM, read only memory ROM, and other sources of resident memory for microprocessor 104. Disc drive 100 includes one or more data storage discs 112. Discs 112 are rotated at a substantially constant high speed by a spindle motor 114 that is controlled by a spindle control circuit 115. In the embodiment of FIG. 1A, a spindle or rotor 117 of the motor 114 holds the disc(s) 112. The motor 114 rotates the spindle or the rotor 117, which spins the disc(s) 112. One or more heads 116 communicate with the surface(s) of discs 112 to carry out data read/write operations. The radial position of heads 116 is controlled through the application of current to a coil in an actuator assembly 119. A servo control system 120 provides such control.

Data is transferred between host computer 102 and disc drive 100 by way of disc drive interface 110, which includes a buffer 118 to facilitate high speed data transfer between host computer 102 and disc drive 100. In one embodiment, buffer 118 is constructed from solid-state components. In certain embodiments, buffer 118 may include a non-volatile memory (NVM) 121 and a volatile memory (VM) 123. In other embodiments, buffer 118 may comprise either NVM 121 or VM 123. While the buffer memory 118 is depicted in FIG. 1A as being physically co-located with interface 110, one skilled in the art should appreciate that buffer 118 may be electrically connected, yet physically separated from interface 110.

Data to be written to disc drive 100 are passed from host computer 102 to buffer 118 and then to a read/write channel 122, which encodes and serializes the data and provides the requisite write current signals to heads 116. To retrieve data that have been previously stored by disc drive 100, read signals are generated by the heads 116 and provided to read/write channel 122. Interface 110 performs read signal decoding, error detection, and error correction operations. Interface 110 then outputs the retrieved data to buffer 118 for subsequent transfer to the host computer 102.

In accordance with some embodiments, data sent from host 102 may be in a form of packets that are sized smaller than a data region of a permanent storage location (e.g., a sector) 130 on disc(s) 112. For instance, the packets may be 512 bytes in length, whereas the data region of each permanent storage location 130 may be 1024 bytes in length, 1536 bytes in length, 2048 bytes in length, etc. Packets received from host 102 that are of a different size (smaller or larger) than an allocated storage capacity of data storage regions of permanent storage locations 130 are referred to herein as unaligned packets. In such embodiments, certain processing needs to be carried out to properly accommodate the unaligned packets into the permanent storage locations 130. The processing can include first reading whatever data is currently stored on physical destination locations (specific ones of permanent storage locations 130), for the unaligned packets, into a buffer or cache, modifying the current data with the data in the unaligned packets, and then writing the modified data to the respective specific ones of the permanent storage locations 130. This process is referred to herein as a "read-modify-write" process.

In some embodiments, the read-modify-write operation may be carried out during idle periods in disc drive 100. In such embodiments, unaligned data packets are first written to a media cache 131, which may be a portion of one or more discs 112. Then, during idle periods, the unaligned packets may be read/transferred into buffer 118 and data may be read form the target physical destination locations 130 and updated with the data in the respective unaligned data packets in buffer 118. The modified data may then be written back to the target physical destination locations 130, thereby completing the read-modify-write operation. Thus, for unaligned data packets, a path traversed may be from host 102 to buffer 118; from buffer 118 to media cache 131; from media cache 131 to buffer 118 as part of a read-modify-write operation; from buffer 118 to the intended destination locations 130 to complete the write part of the read-modify-write operation.

If packets sent by host 102 are sized such that they correspond to (or match) the size of the data region of the permanent storage location (e.g., a sector) 130, they may be directly stored in permanent storage locations 130 without any intermediate storage in media cache 131. Thus, a path for such aligned data packets may be from host 102 to buffer 118 and then directly to the intended destination locations 130 (e.g., NOR Flash).

As can be seen in FIG. 1A, disc drive 100 also includes a non-volatile memory 128 that may serve as, for example, a data cache when events such as a power loss in disc drive 100 occur. In the embodiment of FIG. 1, memory 128 is physically separate from discs 112. The memory 128 may be of a different type than the discs 112. For example, in certain embodiments, memory 128 may be constructed from solid-state components. In one embodiment, memory 128 may be a Flash memory.

In the embodiment of FIG. 1A, disc drive 100 may use at least a portion of memory 128 to store data generated by embedded firmware modules which, in some embodiments, may be also be stored in memory 128. It should be noted that, in different embodiments, the embedded firmware modules may be stored in disc drive 100 memories other than memory 128. Embodiments of the disclosure employ dynamic memory allocation to make the space within memory 128 at least intermittently available to substantially all of the embedded firmware modules. This is carried out by selectively allocating space within memory 128 to different subsets of the embedded firmware modules based on different events/conditions in the drive.

For example, as noted above, upon the power loss event, at least a portion of the non-volatile cache memory space may be allocated to the first subset of embedded firmware modules. Further, upon a subsequent head-disc collision event, the non-volatile cache memory space allocated to the first subset of embedded firmware modules may be reduced/altered and the available free space may be used to store information captured during the catastrophic head-disc collision event. This broadens the use of the space supplied by memory 128 without the need for additional memory. Examples of how memory 128 may operate under the control of microprocessor system or control circuit 104 are provided below in connection with FIGS. 1B-1F.

Figure 1B:
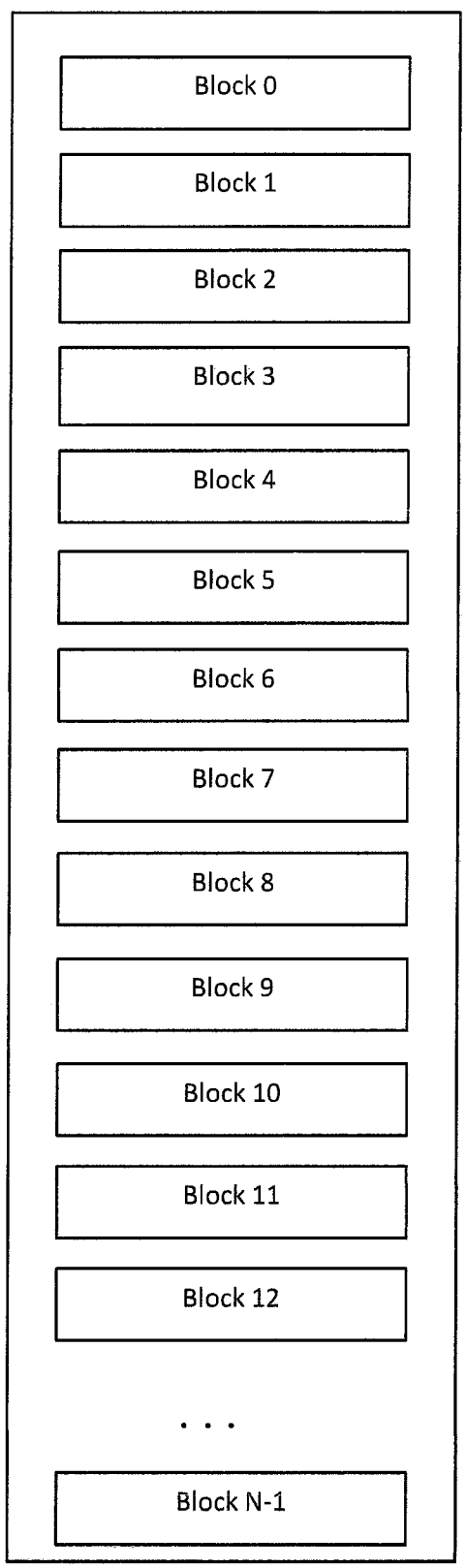
FIG. 1B is a diagrammatic illustration of a memory of FIG. 1A in accordance with one embodiment.
Figure 1C:
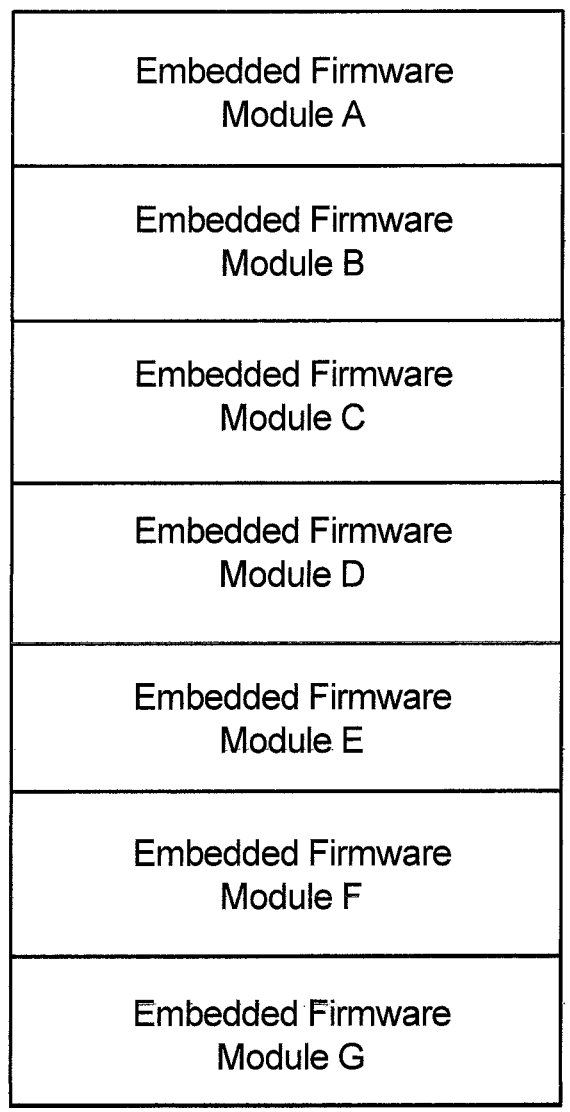
FIGS. 1C-1F are diagrammatic illustrations that together provide an example of memory management in accordance with one embodiment.

FIG. 1B is a diagrammatic illustration of an example in which memory 128 is a solid-state memory having N erasure blocks (Block 0-Block N−1). In an example described below in connection with FIGS. 1C-1F, N is assumed to be equal to 100. Also, for purposes of the example, the number of embedded firmware modules is seven (e.g., embedded firmware modules A-G). Embedded firmware modules A-G are shown in FIG. 1C and may be stored in any suitable location within disc drive 100 (e.g., on a portion of discs 112 and/or within a portion of memory 128). In the interest of simplification, specific storage locations in the disc drive 100 for the embedded firmware modules A-G are not shown. Further, for purposes of the example, all the N blocks of memory 128 are shown as being utilized to store data generated by one or more of the embedded firmware modules A-G.

Figure 1D:
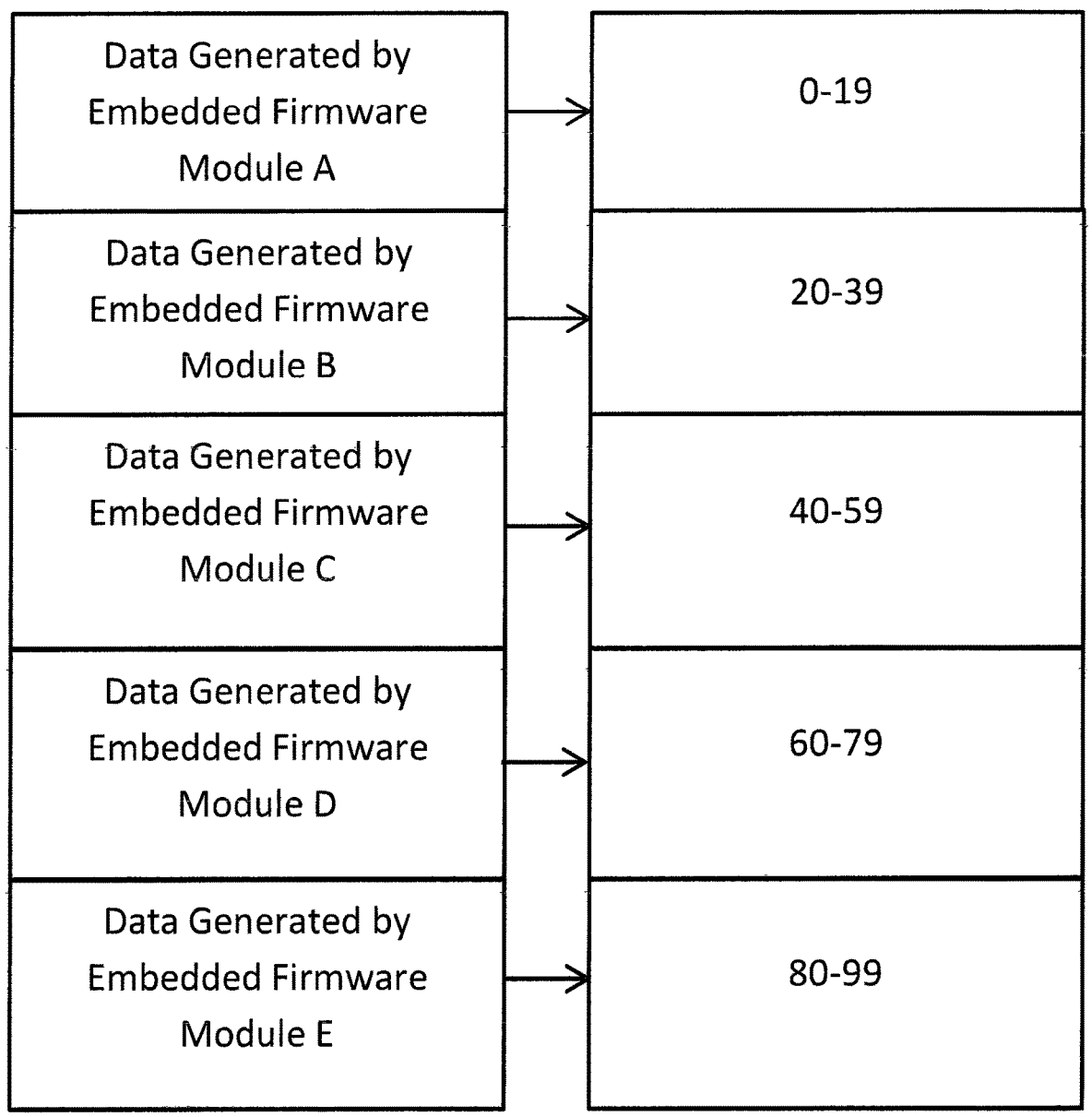

As noted above, a status of disc drive 100 may change in response to an event that takes place within the disc drive 100. FIG. 1D shows an example usage model for memory 128 when disc drive 100 has an initial/nominal status of "1", which may be a status of the disc drive 100 during normal operation. As can be seen in FIG. 1D, under disc drive 100 status "1", erasure blocks 0-19 are allocated for data generated by embedded firmware module A, blocks 20-39 are allocated for data generated by firmware module B, blocks 40-59 are allocated for data generated by embedded firmware module C, blocks 60-79 are allocated for data generated by embedded firmware module D and blocks 80-99 are allocated for data generated by embedded firmware module E. No space in memory 128 is allocated for data generated by embedded firmware modules F and G when the disc drive 100 has a status of "1".

If, for example, there is a loss of power in the disc drive 100, a power-detection sensor (not shown), which is communicatively coupled to microprocessor 104, senses the loss of power and provides an input indicative of the power loss to the microprocessor 104. In response to receiving the power-loss input, microprocessor 104 changes the disc drive status from "1" to "2", for example, to indicate that the power is lost. Also, when power is removed from the operating motor 114, the rotor or spindle 117 gradually spins to a stop and generates a back electromotive force (EMF) voltage over windings of the motor 114. The level of generated voltage may depend on the various properties of the disc(s) 112. For example, the greater the speed of the spinning disc(s) 112 when power is removed from the motor, the more the generated back EMF voltage will be. The generated back EMF of motor 114 may be used to provide a temporary power down power supply to help transfer data from buffer 118 to the non-volatile memory 128. In the interest of simplification, circuitry used to provide a suitable temporary power supply to elements within the disc drive 100 upon power loss is not shown.

Figure 1E:
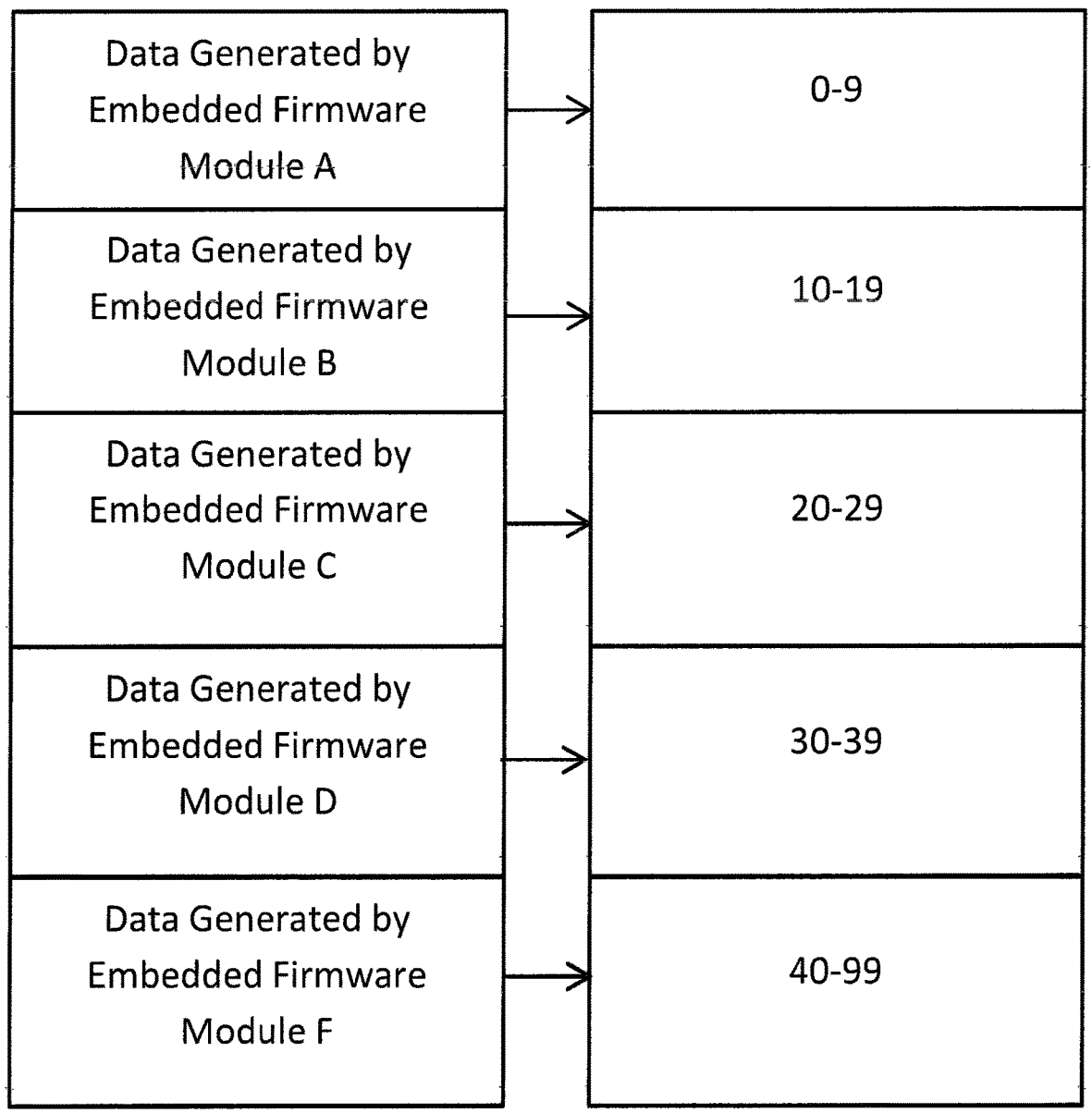

Upon power loss in the drive 100, microprocessor 104 may execute/activate embedded firmware module F, which is capable of transferring data from buffer 118 to non-volatile memory 128. Further, as can be seen in FIG. 1E, a usage model of memory 128 is different for disc drive 100 status "2" (from disc drive status "1") to accommodate the data that may be transferred by embedded firmware module F. In the usage model for disc drive status 2 shown in FIG. 1E, blocks 40-99 of memory 128 are allocated for data transfer by embedded firmware module F, and no space in memory 128 is allocated for data generated by embedded firmware modules E and G. Also, in this usage mode, blocks 0-9 are allocated for data generated by embedded firmware module A, blocks 10-19 are allocated for data generated by embedded firmware module B, blocks 20-29 are allocated for data generated by embedded firmware module C and blocks 30-39 are allocated for data generated by embedded firmware module D. Thus, allocated space for data generated by embedded firmware modules A-D is reduced compared to the space allocated for data generated by the same embedded firmware modules under disc drive status "1". The alterations in allocated space are made to accommodate a potentially large amount of data that may be transferred from the buffer 118 to non-volatile memory 128. It should be noted that, prior to transfer of data from the volatile cache to non-volatile memory 128, a priority/criticality of different data packets or blocks in the buffer 118 may be determined in order to help ensure that the high priority data is not lost as a result of, for example, insufficient back up power to transfer all the data stored in the buffer 118 to into the non-volatile memory 128. The transfer of data packets may then be carried out in the determined order of priority. It should be noted that, the microprocessor/controller 104 is also configured to store data from an incomplete read-modify-write operation in buffer 118 into the non-volatile memory 128.

When power is restored in the disc drive 100, the power-detection sensor (not shown) senses the restoration of power and provides an input indicative of the power restoration to the microprocessor 104. In response to receiving the power-restoration input, microprocessor 104 may change the disc drive status from "2" to "1", for example, to indicate resumption of normal operation. Also, when power is restored in the drive 100, microprocessor 104 may transfer the data stored in one or more of blocks 40-99 of non-volatile memory 128 during power loss to the disc(s) 112.

Figure 1F:
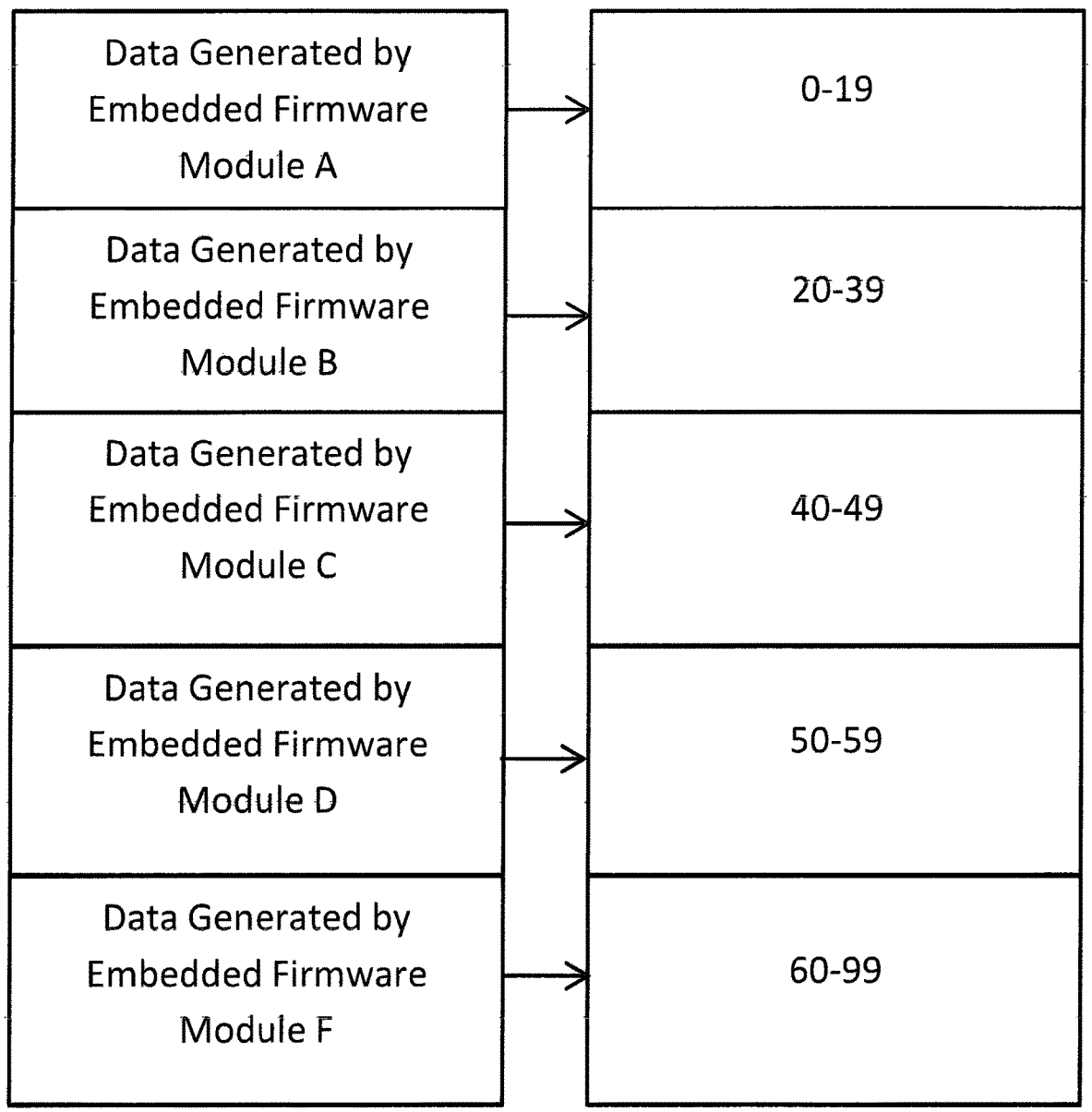

If, for example, a head-disc collision event occurs in the disc drive 100, a collision-detection sensor (not shown), which is communicatively coupled to microprocessor 104, senses the head-disc collision and provides an input indicative of the head-disc collision to the microprocessor 104. In response to receiving the collision-related input, microprocessor 104 changes the disc drive status from "1" to "3", for example, to indicate that the collision has occurred. Also, microprocessor 104 may execute/activate embedded firmware module G, which is capable of collecting information related to the catastrophic event. Further, a usage model of memory 128 is different for disc drive 100 status "3" (from disc drive status "1") to accommodate the data generated by embedded firmware module G. FIG. 1F shows a usage model for memory 128 for disc drive 100 status "3". As can be seen in FIG. 1F, blocks 60-99 of memory 128 are allocated for data generated by embedded firmware module G and no space in memory 128 is allocated for data generated by embedded firmware modules E and F. Also, in this usage mode, blocks 40-49 are allocated for data generated by embedded firmware module C and blocks 50-59 are allocated for data generated by embedded firmware module D, which are reductions in allocated space compared to the space allocated for data generated by the same embedded firmware modules under disc drive status "1". The alterations in allocated space are made to accommodate any data that embedded firmware module G may gather under disc drive status "3."

Power loss and head-collision in disc drive 100 are two example disc drive events that can have data associated with the event stored in non-volatile memory 128. However, any suitable number of events may be defined in disc drive 100, with each event having one or more associated firmware modules that may be executed upon occurrence of the event and that may generate data that may be stored in non-volatile memory 128. The different events may be categorized/classified based on, for example, firmware modules associated with the events. For example, two different events that employ same/similar firmware modules for data gathering may be place in a same category. Further, a source of the each event (e.g., servo, hardware (e.g., head and/or disc, etc.)) and/or conditions in disc drive 100 that lead to the event may be used to identify and classify the event. A global header associated with the non-volatile memory 128 may be updated with new firmware variables that store source information for the respective events. The event source information stored in the global header may be useful for restoring the data on power on, for example. A size, format, etc., of data to be gathered for each event may also be defined. Additionally, as indicated above, for events such as a power loss, data packets to be transferred from buffer 118 to non-volatile memory 128 may be prioritized to help ensure that high-priority data is stored in non-volatile memory 128 before disc drive 100 runs out of back EMF power.

A Save table may be defined with information about the event data to be saved (e.g., a start address of the data in memory 128, a size of the data, a format of the data (e.g., metadata or user data)), etc. Also, a Restore may be defined with information about an order in which a client may desire the data to be retrieved. Further, an Event table that associates each event with the corresponding Save and Restore tables for the event may be defined.

The data to be stored in non-volatile memory 128 may be modularized into a user-readable format so that it can be distributed to multiple clients or sub-clients of a generic client. Data structures may be defined for metadata so that the non-volatile memory 128 (e.g., Flash memory) can be read and parsed by external parsers even if the medium is format corrupt/non-readable.

Memory management procedures are included to indicate, for example, whether the non-volatile memory 128 space may be erased upon power on or upon the occurrence of some other event. To reduce a frequency of erasure, memory blocks may be used in a round robin fashion.

In the example described above, all blocks within non-volatile memory 128 are utilized to store data generated by different firmware modules. However, in another embodiment, a first portion of the set of N blocks of memory 128 are employed to store firmware modules and a second portion of the set of N blocks of memory 128 is employed to store data generated by one or more of the embedded firmware modules stored in the first portion of the set of N blocks of memory 128.

Figure 2:
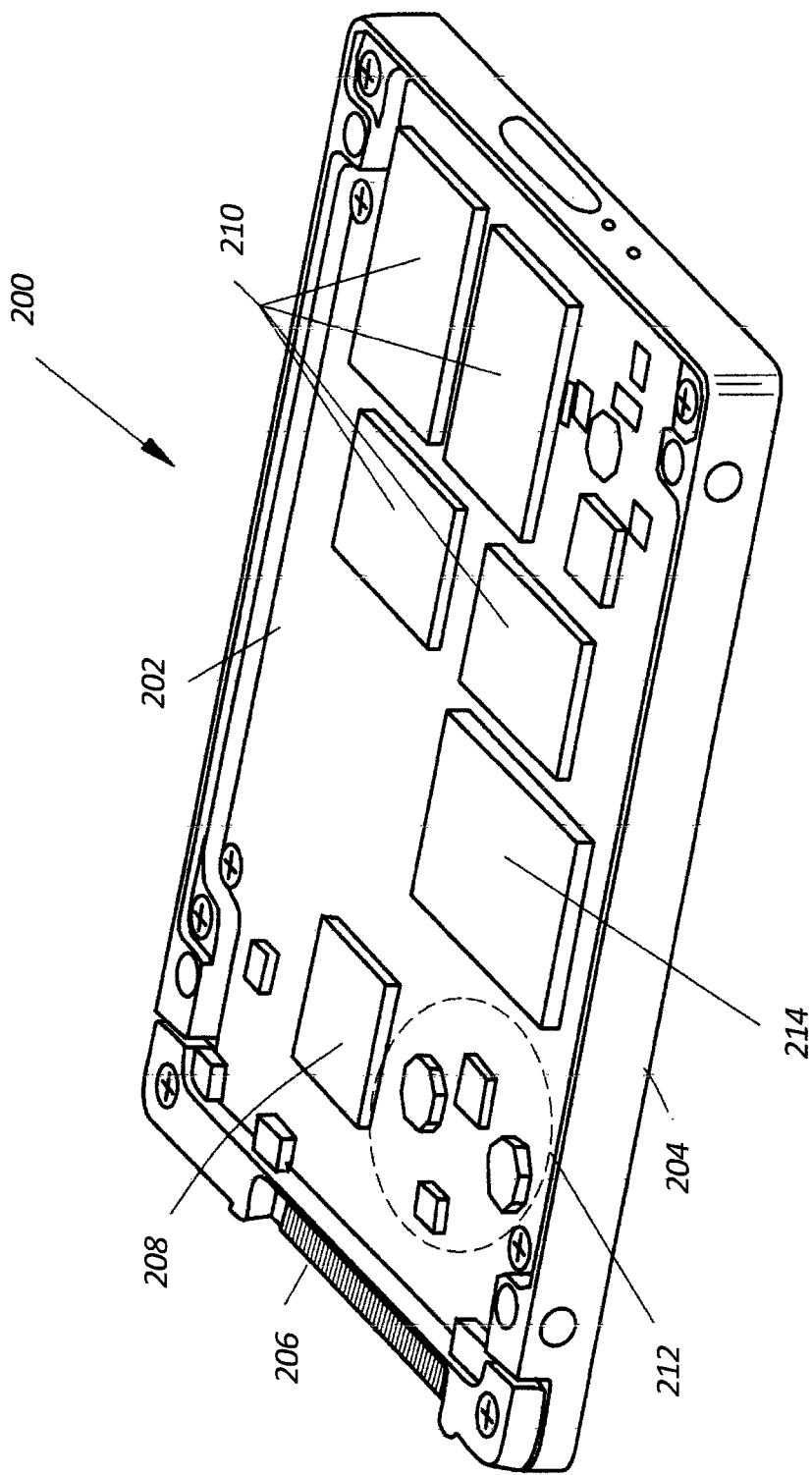
FIG. 2 is an isometric view of a solid-state drive that employs a memory management technique in accordance with one embodiment.

FIG. 2 illustrates an oblique view of a solid state drive (SSD) 200 in which the memory management techniques described above are useful. SSD 200 includes one or more circuit card assemblies 202 and typically includes a protective, supportive housing 204, a top cover (not shown), and one or more interface connectors 206. SSD 200 further includes a controller ASIC 208, one or more non-volatile memory devices 210, and power regulation circuitry 212.

The memory devices 210 are essentially the SSD's data storage media for the caches and main store. In some applications, SSD 200 further includes a power-backup energy storage device, such as a super-capacitor 214.

In accordance with certain aspects, the SSD 200 includes a circuit card assembly 202 that includes a connector 206 for connection to a host computer. In accordance with certain aspects, the connector 206 includes a NVMe (non-volatile memory express), SCSI, SAS, FC-AL (fiber channel arbitrated loop), PCI-E (peripheral component interconnect express), IDE (integrated drive electronics), AT (advanced technology), ATA (advanced technology attachment), SATA, IEEE (institute of electrical and electronics engineers)-1394, USB or other interface connector adapted for connection to a host.

If, as shown in FIG. 2, more than one non-volatile memory device 210 is included in SSD 200, then one of the non-volatile memory devices 210 may be used as a media cache. Physical storage locations (for example, erasure blocks) in the other one or more non-volatile memory devices 210 may be utilized as non-volatile cache (such as 128 described above in connection with FIGS. 1A-1F) and as main storage locations. In SSD 200, controller ASIC 208 may include instructions to change usage modes of the non-volatile cache in response to SSD 200 status changes in a manner described above.

In accordance with various embodiments, the methods described herein may be implemented as one or more software programs running on one or more computer processors or controllers, such as those included in devices 100 and 200. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   data storage media, with at least one of the data storage media comprising a plurality of embedded firmware modules;
   the data storage media comprising a non-volatile memory having a first overall memory space and having different usage modes, with each different usage mode being associated with a different status of the data storage device, and each of the different usage modes having different space allocation configurations in the non-volatile memory for data generated by the plurality of embedded firmware modules; and
   a controller communicatively coupled to the non-volatile memory, the controller configured to:
      determine a change in the status of the data storage device in response to an event that places the data storage device in an operating mode other than a normal operating mode of the data storage device; and
      in response to the change in the status of the data storage device, dynamically alter the usage mode of the non-volatile memory from a first one of the usage modes to a second one of the usage modes, thereby dynamically altering the space allocation configurations for the data generated by the plurality of embedded firmware modules, such that at least a portion of a first space in the non-volatile memory allocated for data generated by a first firmware module before the change in the status of the data storage device is directly reallocated for data generated by a second firmware module in response to the change in the status of the data storage device, the direct reallocation reducing a percentage of the first space in the non-volatile memory allocated for the data generated by the first firmware module, and confining usage of memory space for the data generated by the first and second firmware modules to be within the first overall memory space of the non-volatile memory, the second firmware module being associated with the event that places the data storage device in the operating mode other than the normal operating mode of the data storage device.

2. The data storage device of claim 1 and wherein the non-volatile memory is a non-volatile cache memory configured to temporarily store data during a power loss condition in the data storage device.

3. The data storage device of claim 2 and wherein, during the power loss condition, the controller is further configured to store data from an incomplete read-modify-write operation into the non-volatile memory.

4. The data storage device of claim 1 and wherein the controller is further configured to carry out overlay operations in the non-volatile memory, the overlay operations comprising, at different times, writing data generated by different ones of the embedded firmware modules in a same portion of the non-volatile memory.

5. The data storage device of claim 1 and wherein the data storage media comprise one or more solid-state memories, and wherein the non-volatile memory is a solid-state memory.

6. The data storage device of claim 1 and wherein the data storage media comprise one or more data storage discs, and wherein the non-volatile memory is a solid-state memory.

7. The data storage device of claim 1 and wherein the event comprises a collision of moving components in the data storage device, and wherein, in response to the change in the status of the data storage device as a result of the collision of the components, a percentage of the first space in the non-volatile memory allocated for the data generated by the first firmware module is reduced.

8. A method comprising:
   providing a data storage device having data storage media, with at least one of the data storage media comprising a plurality of embedded firmware modules, the data storage media comprising a non-volatile memory having a first overall memory space and having different usage modes, with each different usage mode being associated with a different status of the data storage device, and each of the different usage modes having different space allocation configurations in the non-volatile memory for data managed by the plurality of embedded firmware modules;
   detecting an event in the data storage device that causes a change in a status of the data storage device, the change in the status of the data storage device placing the data storage device in an operating mode other than a normal operating mode of the data storage device; and
   upon determining that the status of the data storage device has changed as a result of the detected event, dynamically altering the usage mode of the non-volatile memory in the data storage device from a first one of the usage modes to a second one of the usage modes, thereby dynamically altering the space allocation configurations for the data managed by the plurality of embedded firmware modules, such that at least a portion of a first space in the non-volatile memory allocated for data managed by a first firmware module before the change in the status of the data storage device is directly reallocated for data managed by a second firmware module in response to the change in the status of the data storage device, the direct reallocation reducing a percentage of the first space in the non-volatile memory allocated for the data generated by the first firmware module, and confining usage of memory space for the data generated by the first and second firmware modules to be within the first overall memory space of the non-volatile memory, the second firmware module being associated with the event that causes the change in the status of the data storage device to the operating mode other than the normal operating mode of the data storage device.

9. The method of claim 8 and wherein the event comprises one of a loss of power in the data storage device or a collision of moving components in the data storage device.

10. The method of claim 8 and wherein the event comprises a collision of components in the data storage device, and wherein, in response to the change in the status of the data storage device as a result of the collision of the components, a percentage of the first space in the non-volatile memory allocated for the data generated by the first firmware module is reduced.

11. The method of claim 8 and wherein the non-volatile memory is employed as a cache memory.

12. The method of claim 8 and wherein the event comprises a loss of power in the data storage device, and wherein the method comprises storing data from an incomplete read-modify-write operation in the data storage device into the non-volatile memory during the loss of power in the data storage device.

13. The method of claim 8 and further comprising, at different times, writing data managed by different ones of a plurality of embedded firmware modules in a same portion of the non-volatile memory.

14. A data storage device comprising:
   a non-volatile memory including a first portion having a plurality of embedded firmware modules and a second portion configured to store data generated by the embedded firmware modules;
   the second portion of the non-volatile memory having a first overall cache memory space and having different usage modes, with each different usage mode being associated with a different status of the data storage device, and each of the different usage modes having different space allocation configurations in the second portion of the non-volatile memory for the data generated by the plurality of embedded firmware modules; and
   a controller communicatively coupled to the non-volatile memory, the controller configured to:
      determine a change in the status of the data storage device in response to an event that places the data storage device in an operating mode other than a normal operating mode of the data storage device; and
      in response to the change in the status of the data storage device, alter the usage mode of the second portion of the non-volatile memory from a first one of the usage modes to a second one of the usage modes, thereby altering the space allocation configurations for the data generated by the plurality of embedded firmware modules, such that at least a portion of a first space in the second portion of the non-volatile memory allocated for data generated by a first firmware module before the change in the status of the data storage device is directly reallocated for data generated by a second firmware module in response to the change in the status of the data storage device, the direct reallocation reducing a percentage of the first space in the non-volatile memory allocated for the data generated by the first firmware module, and confining usage of memory space for the data generated by the first and second firmware modules to be within the first overall cache memory space of the second portion of the non-volatile memory, the second firmware module being associated with the event that places the data storage device in the operating mode other than the normal operating mode of the data storage device.

15. The data storage device of claim 14 and wherein the second portion of the non-volatile memory is configured to temporarily store data during a power loss condition in the data storage device.

16. The data storage device of claim 15 and wherein, during the power loss condition, the controller is further configured to store data from an incomplete read-modify-write operation into the second portion of the non-volatile memory.

17. The data storage device of claim 14 and wherein the controller is further configured to carry out overlay operations in the second portion of the non-volatile memory, the overlay operations comprising, at different times, writing data generated by different ones of the embedded firmware modules in a same memory location of the second portion of the non-volatile memory.

18. The data storage device of claim 14 and wherein the data storage media comprise one or more solid-state memories, and wherein the non-volatile memory is a solid-state memory.

19. The data storage device of claim 14 and wherein the data storage media comprise one or more data storage discs, and wherein the non-volatile memory is a solid-state memory.

20. The data storage device of claim 14 and wherein the event comprises a collision of moving components in the data storage device, and wherein, in response to the change in the status of the data storage device as a result of the collision of the components, a percentage of the first space in the non-volatile memory allocated for the data generated by the first firmware module is reduced.

* * * * *